United States Patent [19]

Wellenhofer et al.

[11] Patent Number: 5,267,378
[45] Date of Patent: Dec. 7, 1993

[54] CLIP WITH ROCKING BEARING FOR STRETCHING MACHINES

[75] Inventors: Peter Wellenhofer, Grassau-Mietenkam, Fed. Rep. of Germany; Paul Lindner, Henndorf am Wallersee, Austria

[73] Assignee: Bruckner Maschinenbau Gernot Bruckner GmbH & Co., Seigsdorf, Fed. Rep. of Germany

[21] Appl. No.: 778,882

[22] PCT Filed: Apr. 2, 1991

[86] PCT No.: PCT/EP91/00627

§ 371 Date: Dec. 27, 1991

§ 102(e) Date: Dec. 27, 1991

[87] PCT Pub. No.: WO91/17107

PCT Pub. Date: Nov. 14, 1991

[30] Foreign Application Priority Data

May 3, 1990 [DE] Fed. Rep. of Germany ....... 4014227

[51] Int. Cl.⁵ .............................................. D06C 3/04
[52] U.S. Cl. ............................................ 26/93; 26/89
[58] Field of Search .................... 26/93, 94, 95, 88, 89; 269/238; 248/316.7, 316.5

[56] References Cited

U.S. PATENT DOCUMENTS

| | | | |
|---|---|---|---|
| 850,932 | 4/1907 | Honeyman | 26/93 |
| 1,273,610 | 7/1918 | Hoey | 26/93 |
| 1,517,225 | 11/1924 | Whitley | 26/93 |
| 1,799,446 | 4/1931 | Stelling | 26/93 |
| 1,822,676 | 9/1931 | Stelling | 26/93 |
| 1,928,930 | 10/1933 | De Juhasz | 308/2 |
| 3,748,704 | 7/1973 | Schmidt et al. | 26/93 |
| 3,948,508 | 4/1976 | Kanazawa | 271/206 |
| 4,658,482 | 4/1987 | Lechner | 26/93 |

FOREIGN PATENT DOCUMENTS

| | | |
|---|---|---|
| 0212985 | 7/1990 | European Pat. Off. . |
| 1924731 | 11/1969 | Fed. Rep. of Germany . |
| 1924731 | 7/1973 | Fed. Rep. of Germany . |
| 2519610 | 11/1976 | Fed. Rep. of Germany . |
| 3229098 | 2/1984 | Fed. Rep. of Germany . |
| 3629508 | 3/1988 | Fed. Rep. of Germany . |
| 476652 | 1/1938 | United Kingdom . |
| 1201738 | 8/1970 | United Kingdom ..... 26/93 |

Primary Examiner—Clifford D. Crowder
Assistant Examiner—Amy B. Vanatta
Attorney, Agent, or Firm—Nixon & Vanderhye

[57] ABSTRACT

Conventional clips must be manufactured with high precision and run the risk of becoming stiff in the course of time or even to become inoperative in extreme cases due to sediments in their pivoting mechanism. In order to obtain a clip which remains operational in spite of sediments and the danger of clogging and which is furthermore easy to assemble and disassemble, the clip lever is supported with a first bearing part on another bearing part on the side of the clip body, forming a kind of rocking bearing. The rocking bearing can in particular be composed of a knife-edge or rolling bearing. This clip is particularly useful for plastics stretching machines.

18 Claims, 10 Drawing Sheets

CLIP WITH ROCKING BEARING FOR STRETCHING MACHINES

The invention relates to a clip for detachably holding a moving fabric web.

Clips are for clamping fabric webs, particularly sheet webs, when the sheets are moved horizontally. For example, in a device for stretching plastic sheet webs, a closed guiding device is provided on opposite sides of the web and is symmetrical to the conveying direction. A guiding device on which endless clip chain links or clip carriages are connected with one another are provided, the clips gripping the fabric or sheet web at the beginning of the device and moving it forward to the end of the device.

Clip levers on the clips are pivoted at the beginning of the device by appropriate operating links, into their closed locked position, in which they hold the fabric or sheet web clamped between a clamping piece and a clip table, and, at the end of the device into their open position, in which they again release the fabric or sheet web. The clips, according to the prior art, are provided with a pin bolt, which is supported in a journal bearing mounted on the clip body.

The manufacturing costs for such clips and clip bearings are considerable, particularly because their manufacture requires adherence to the highest of tolerances. This can readily be seen, for example, in that the plastic sheet webs to be clamped have a sheet thickness of up to about 2 microns. The required tolerance for the clips should therefore be at least 1 micron.

Furthermore, there is always the problem that the journal bearings, particularly in devices for stretching plastic sheet webs, become, over time and use, increasingly dirty. This leads to undesirable stiffness of the clip levers or, in extreme cases, even prevents a pivoting motion of the clip levers. The problem of dirt accumulation and deposits occurs especially when stretching sheets with high proportions of additives, such as those added to plastic sheets, for example, to prevent an antistatic charge, to increase sealing qualities and also to place barrier layers in the plastic sheet webs. The deposits from these additives in the bearings leads to dirt accumulation and sticking, by which the efficiency of the unit as a whole is reduced.

Cleaning and removing deposits of this type from the prior art clip levers is costly. While the actual clamping piece can often be cleaned by pivoting the clip lever into a cleaning position, the removal of the clip levers in total from the device is often necessary to effectively clean the pivot journals. This requires the removal of a whole clip carrier or clip body in order to gain access to the rotating shafts. The assembly and disassembly of the clips is thus time-consuming and expensive.

The object of this invention is therefore to overcome the disadvantages according to prior art and to create a clip that avoids sticking even should sheet deposits and dirt accumulation occur. It is also an object hereof to assemble and disassemble clips of this type much more easily than the clips of the prior art.

According to the present invention, a bearing arrangement of the clip lever is provided in the manner of a cradle, i.e., a swiveling axis body-free bearing arrangement. This cradle bearing arrangement can take place in the manner of a "knife-edge bearing" or in the manner of a "roller bearing". In such a knife-edge bearing, the knife edge tapers and lies in a wedge-shaped bearing surface. Consequently, when high surface bearing pressures occur, a self-cleaning action occurs. Accumulations of sheet deposits and dirt are automatically pressed out of these bearing surface areas. Accumulations of these types in this bearing surface area may have a certain lubricating effect and contribute to the reduction of friction. The bearing surfaces hereof do not have narrow cross sections that can become clogged or gummed up, and operating safety is also increased. Finally no further lubrication is necessary. As a further advantage, the cradle bearing enables the clip lever to have high opening and closing speeds and for this purpose requires only little opening force. A so-called slip-stick effect as in the prior art is also avoided according to the invention.

Finally the knife edge and roller radii can be selected according to the anticipated load with corresponding selection of materials.

Furthermore, the clip lever according to the invention can also be installed and removed with fewer problems in comparison to the prior art. Dismantling an entire clip carriage or clip body as a prerequisite to dismantling a clip lever is no longer necessary.

Furthermore, a catch safety is also provided to guarantee that when the opened clip lever pivots into its locked closed position, and the locking forces are high, the clip lever is prevented from being lifted off and shifted from its cradle bearing over and above a predetermined measure.

Despite the fact that the present clip levers are held on the cradle bearing only by positive and/or nonpositive locking, the support for the clip lever is arranged so that even in the event of an unforeseen fracture of the double function spring which biases the clip lever into open and closed positions, the clip lever is securely held on the clip body.

In a preferred embodiment of the invention, the bearing arrangement is performed at least slightly in a crowned manner in the longitudinal direction of the axis of tilt. This makes possible a self-adjustment parallel to the sheet and to the clip table. This is significant in view of the nominal thicknesses of the plastic sheets, e.g., about up to 2 microns, which according to the prior art required a maximum degree of manufacturing precision for the clip bearing, to maintain tolerances of less than 1 micron. By this bearing arrangement and its self-adjustment, the sheet that is to be clamped is always gripped over its whole surface on the clamping segment of the clip lever and is clamped in sandwich fashion, without any need for maintaining high manufacturing tolerances according to the prior art.

Further advantages, details and features of the invention follow below from the embodiments represented by drawings. There are shown in particular in.

Figure 1:
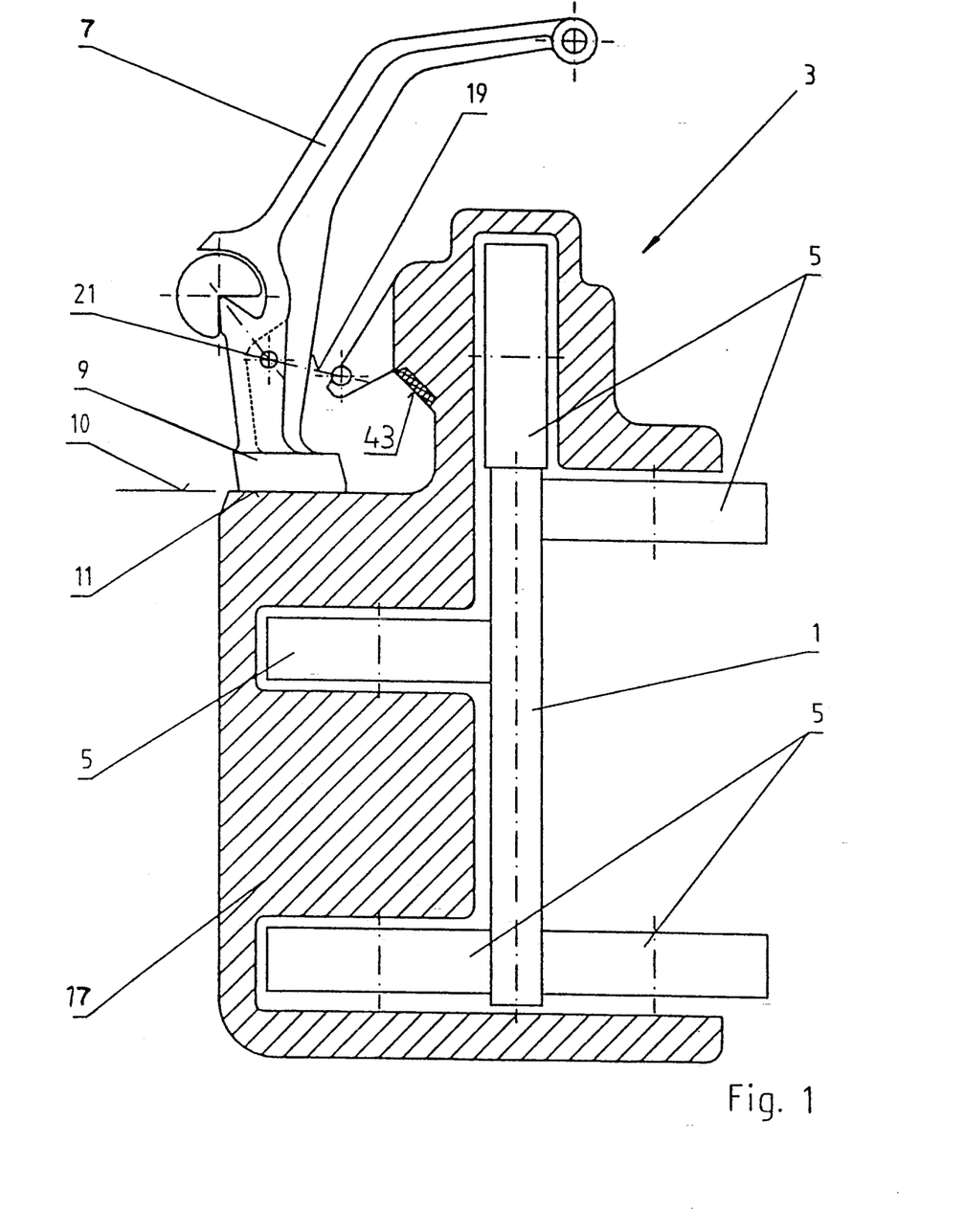
FIG. 1 is a diagrammatic vertical cross-sectional representation through a clip according to the invention and located on a clip carriage.

FIG. 1 illustrates, in a diagrammatic vertical cross-sectional view, a clip carrier 3 that forms a part of a revolving conveyor chain extending crosswise to guide rail system 1. The clip carrier 3 is conveyed by several rollers 5 along guide rail system 1 in a generally known manner.

On the upper side of the clip carrier, a clip lever 7 is provided that can be pivoted between its locked and opened positions.

In its locked operating position, its lower clamping piece 9 lies on clip table 11. In this operating position, a sheet or fabric web 10, that extends to the left in FIG. 1, is gripped on its edge between clamping piece 9 and clip table 11, i.e., the sheet or fabric edge, is clamped in sandwich fashion between the clamping piece and the clip table.

Figure 2:
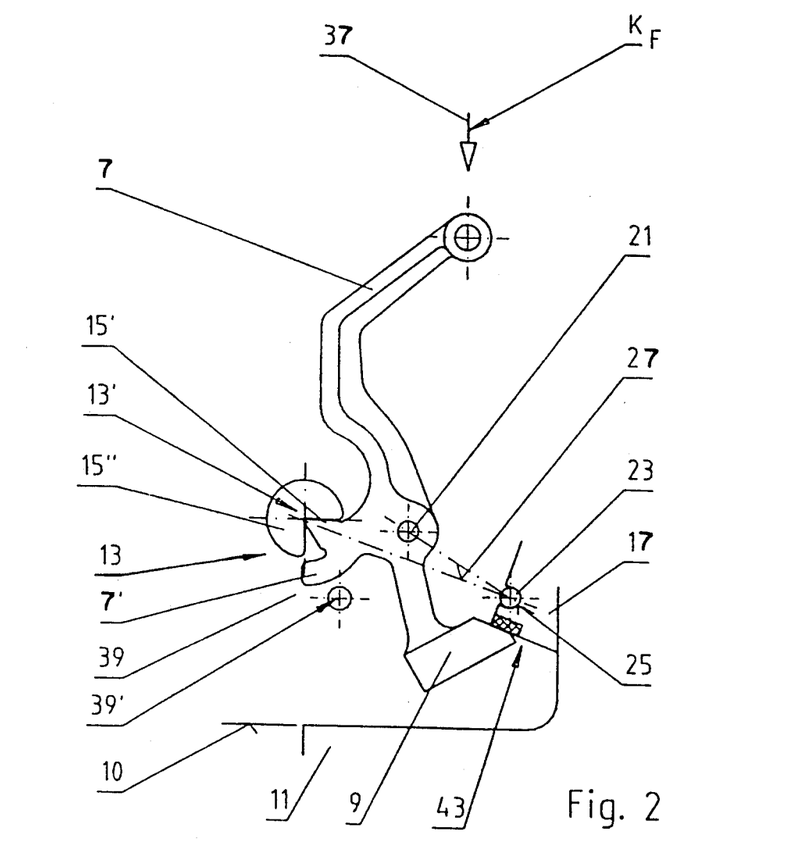
FIG. 2 is a representation of the clip lever in the opening position.

The clip lever 7, represented in FIGS. 1 to 3, can be pivoted, for example, through an angle of less than 40°, in the embodiment shown, through about 30° to its open position represented in FIG. 2.

Cradle bearing 13, which in the embodiment according to FIGS. 1 to 4 can also be designated as knife-edge or knife bearing 13′, serves as a pivoting bearing.

Knife-edge or knife bearing 13′ comprises two interacting bearing parts 15′ and 15″. Knife-edge or knife-shaped bearing part 15′ forms a part of clip lever 7. A second counter bearing part 15″ equipped with a sector shaped, i.e. V-shaped, bearing recess, is supported in a stationary manner on clip body 17 forming part of clip carrier 3. The sector-shaped bearing recess representing a pivoting limit comprises an angle of between 80° and 100° in the shown, e.g., about 90°. The angle may be an acute angle or an obtuse angle in appropriate coordination with the angle cross-section of the knife-edge or knife shaped part 15′.

The actual knife-edge or knife radius for a correspondingly adapted radius of the edge on the V-shaped bearing recess, can be preselected according to the required pressing forces. Bearing part 15′ can also be made as a replaceable insert.

Furthermore, a so-called double-function spring 19 is provided and comprises a pressure spring which can be supported, for example, by bolt 21 on clip lever 7 and by bolt 23 on clip body 17. Bolt 23 can engage and rest in an eye-shaped indentation 25 that has a semi-cylindrical opening. Springs, like double-function springs 19, have long been known and are placed as a rule in a protective sleeve or two sleeve parts that can be telescoped into one another. It is also conceivable to use two double-function springs per knife blade.

Double-function spring 19 has a dead center characteristic, so that, when clip lever 7 is pivoted from its locked position into its open position or vice versa, the line of action 27 representing a dead center line is always crossed, so that the clip lever is held by double-function spring 19 in its respective end position, in other words prestressed in this position both in its locked position and in its open position and not able to pivot back automatically.

Figure 4:
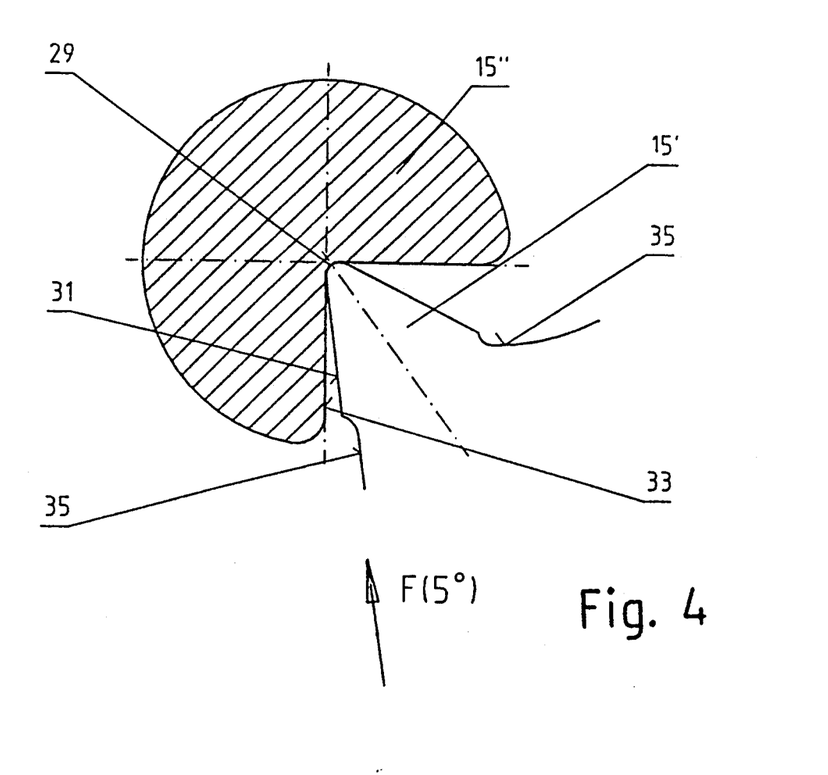
FIG. 4 is an enlarged detailed representation of the knife-edge bearing.

FIG. 4 shows an enlarged detailed representation of the knife-edge bearing. From this figure it can be seen that, in the lower locked position, there is a tolerance or angle between boundary wall 31 of knife-shaped bearing part 15′ (that is aligned parallel to pivoting axis or axis of tilt 29 that runs in longitudinal direction, i.e. in the direction of conveyance of the clip carriage) and the adjacent boundary wall 33 of a V-shaped bearing recess that represents a pivoting boundary. This tolerance or angle may receive deposits that may collect in the knife-edge bearing and these deposits can be forced radially outwardly by the high pressing pressure especially in the immediate area of the axis of tilt 29 that absorbs the high pressure forces. Undercut 35 can also be designed in radial alignment on knife-shaped bearing part 15′ and optionally also on stationary second bearing part 15″ equipped with the sector-shaped bearing recess.

When the rocker lever is pivoted from its opened position shown in FIG. 2 to its locked position represented in FIG. 1, locking forces $K_F$ on the clip lever are initiated as represented by arrow 37. To prevent an unintended lifting of knife-shaped bearing part 15′ out of the V-shaped bearing recess, an additional adjustment limit 39 is provided in the form of stop 39′, which is supported on a side of the clip body. Normally double-function spring 19 is designed so that bearing part 15′ is constantly held in bearing part 15″ in the bottom of the V-shape and which forms pivot axis 29. If for any reason the force of the double spring should be insufficient, then arc-shaped projection 7′ on clip lever 7 would strike the bolt-shaped catch or projection 39′, running in longitudinal direction, while overcoming only slight play. Any further lifting or drifting apart of the two bearing parts 15′ and 15″ is then not possible. Besides, any lifting would then also be short-lived, since both bearing parts are then brought together again by the double-function spring, so that the knife edge comes to rest on the V-shaped bottom of second bearing part 15″.

To limit pivoting in the opened position, stop 43 or a damped stop is provided for clip lever 7. Alternatively, it would also be possible that a segment of clip body 17, diagrammatically indicated only in FIG. 2, is provided as a stop 43. In any event, double-function spring 19 serves this purpose in general and its bolt 23 supported in the clip body serves that purpose in particular.

Figure 3A:
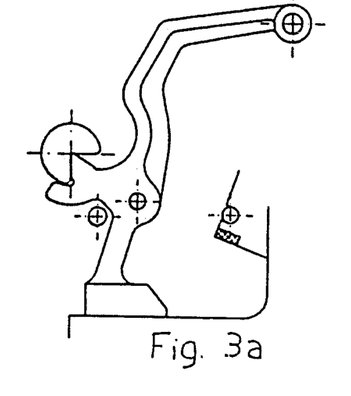
FIGS. 3a to 3f are further representations of the clip lever shown in FIGS. 1 and 2 during assembling or dismantling.
Figure 3B:
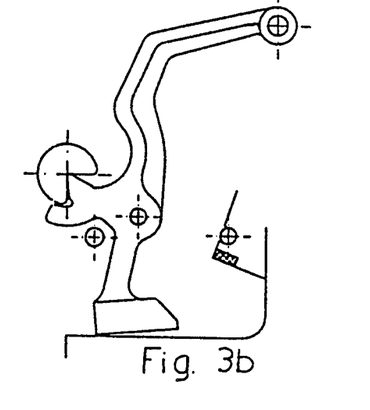
Figure 3C:
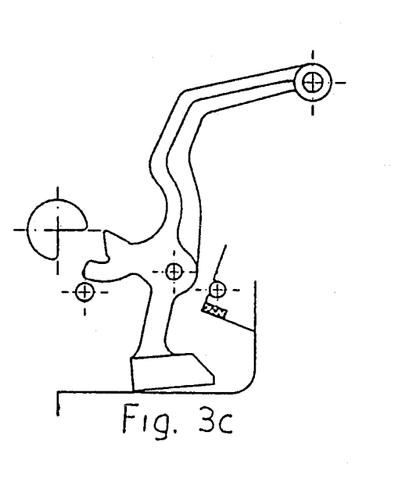
Figure 3D:
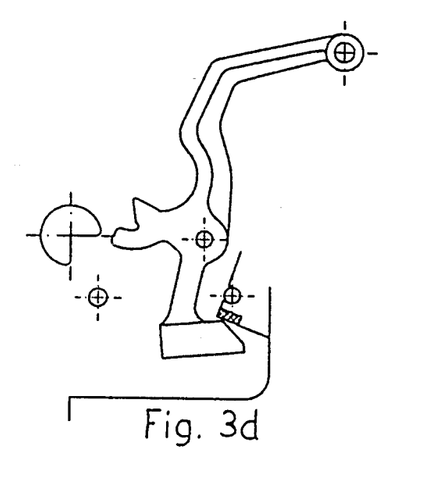
Figure 3E:
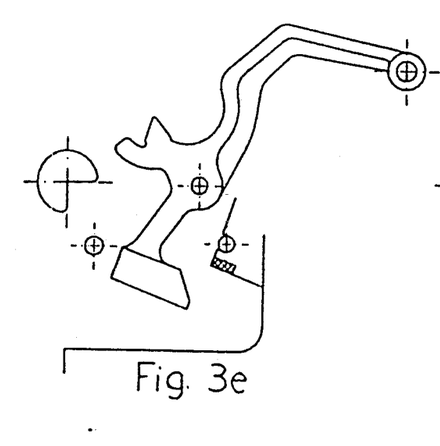
Figure 3F:
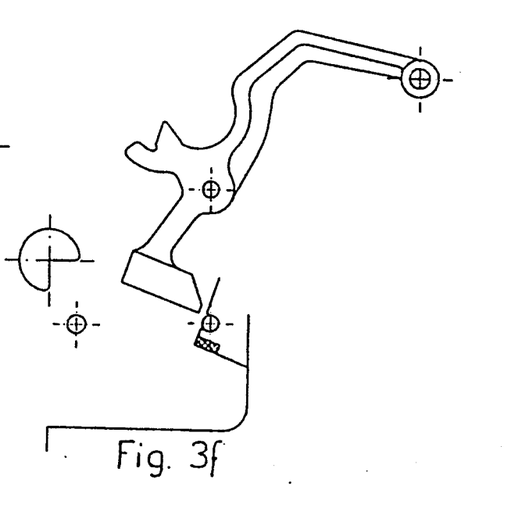

To install and remove the clip lever, it is only necessary to unhinge the double-function spring by taking out bolt 23 and pivoting spring 19. Since in the one embodiment the stop limit in the form of the double-function spring or associated bolt 23 thereby also becomes unnecessary, then, as is represented in FIG. 3, clip lever 7 can be pivoted counterclockwise without difficulty and removed. Where lever 7 engages stop 43 upon removal of lever 7, removal of the clip lever is possible because the latter is first pivoted slightly from its locked position represented in FIG. 1, for example up to 5° in the opening direction and then, as illustrated in FIGS. 1-3, is shifted slightly to the right, until knife-shaped bearing part 15' is laterally offset relative to second bearing part 15", so that the clip lever can then be removed by moving it upwardly and with a slight pivoting motion as illustrated in FIG. 3e. Assembly may take place in the opposite order. Disassembly in this case is represented in the successive steps according to FIGS. 3a to 3f.

Figure 3G:
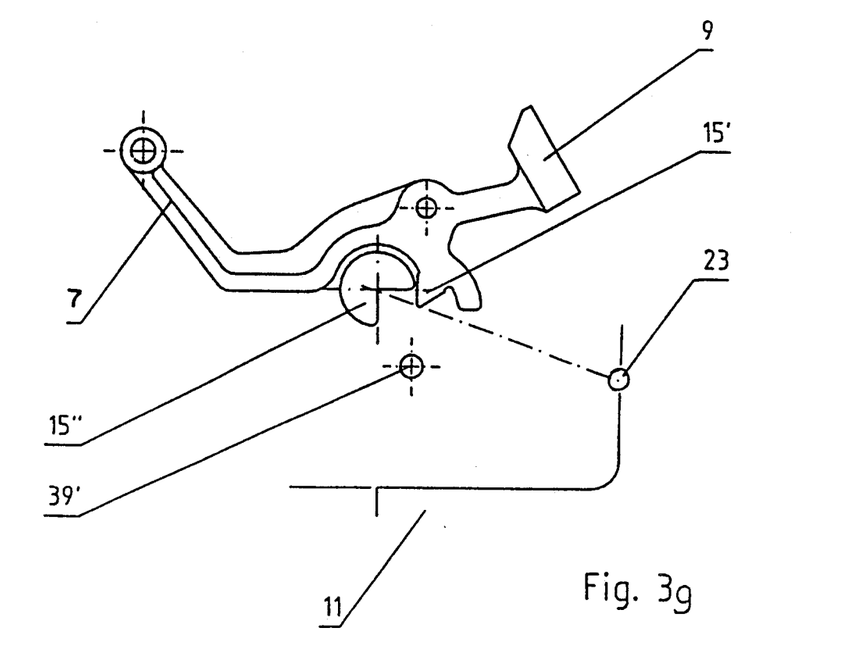
FIG. 3g is an alternative example for assembling and dismantling of the clip lever.

In FIG. 3g an alternative for installing and removing clip lever 7 is represented. In this embodiment, bolt 23 is supported on clip body 17 so that after double-function spring 19 has been removed or unhinged, clip lever 7 can be immediately pivoted counterclockwise around bearing piece 15". In this embodiment, double-function spring 19, which is ordinarily protected by an internal directional rod or by an outer metal sleeve or two sleeve parts that can be telescoped into one another, is used as actual stop 43.

Figures 5A, 5B:
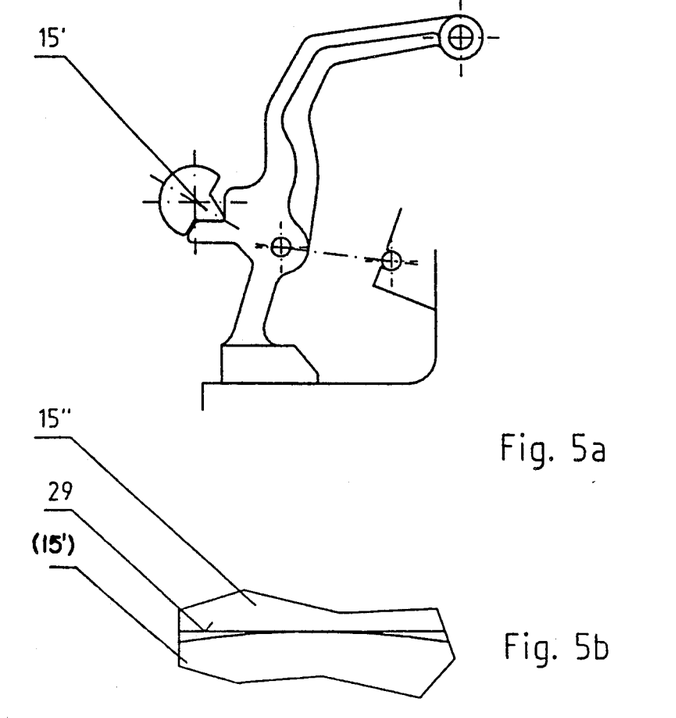
FIG. 5a is an alternative partial display with kinematically exchanged knife-edge bearing arrangement.
FIG. 5b is a lateral representation of a curved knife-edge.

FIG. 5a discloses a further embodiment of the bearing hereof. For example, both bearing parts 15' and 15" are interchanged in the sense of a kinematic exchange. In other words, the knife-edge or knife-shaped bearing part is supported in a stationary manner on clip body 17 and second bearing part 15" that interacts with it is designed on clip lever 7 which exhibits the V-shaped bearing recess.

To guarantee the simplest possible self-alignment of clip lever 7 even when there are tolerance errors, the knife-edge that is located in the bottom of the V-shaped indentation can be designed at least somewhat crowned, so that this knife-shaped bearing part 15' can pivot slightly back and forth on pivot and axis of tilt 29 that runs lengthwise in the direction of clip carriage 3. Thus an automatic self-alignment parallel to the sheet and to the clip table is always guaranteed.

Figure 6:
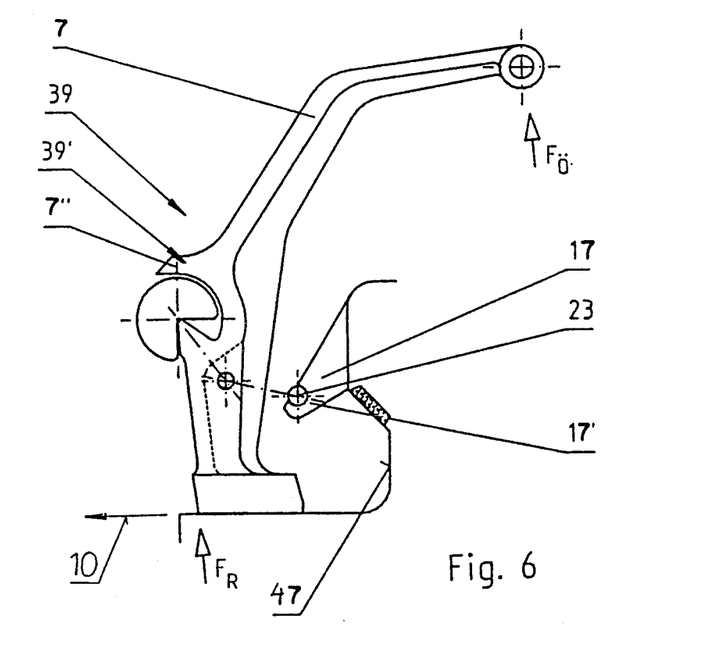
FIGS. 6 and 7 are diagrammatic vertical cross-sectional views of a further embodiment hereof with a clip lever shown in closed and open positions.
Figure 7:
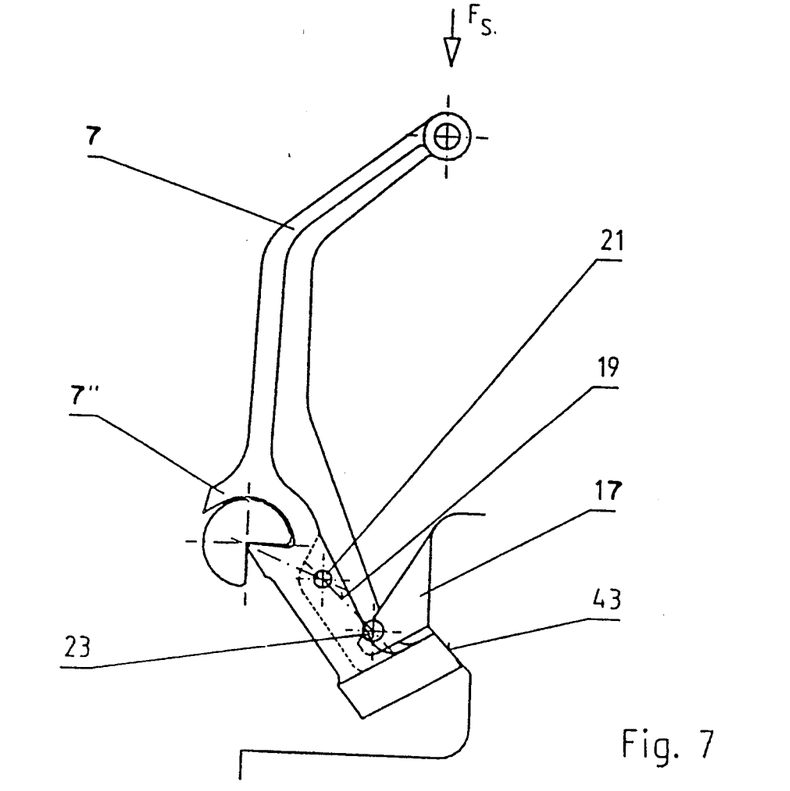

In FIGS. 6 and 7, a modification of the preceding figures is shown. Here, adjustment limit 39 comprises projection 7" which juts out over bearing part 15", a projection 7" resting above bearing part 15" and having slight play or tolerance with bearing part 15". When the clip lever is adjusted from its open position to its locked position, this arched-shaped projection 7" strikes the cylindrical boundary wall of bearing part 15", when the clip lever is pressed downward from its bearing anchoring in the direction of clip table 11, after the allowed play or tolerance has been overcome, thus limiting evading movement of the clip lever. The double-spring device, after this brief evading movement, returns the clip lever again into its ideal storage position.

Finally, in this embodiment, bolt 23 is supported on segment 17' of clip body 17, segment 17' protruding in the direction of the sheet or fabric web. In the event of a possibly occurring break of a double-function spring, the clip lever would be securely held by it. By undercut 47, both assembly and disassembly are possible. The clip lever is first pivoted a few degrees in the open position and then in the representation according to FIG. 6 is shifted to the right, until the knife edge is exposed again and the clip lever can be removed upward without difficulty by carrying out a further pivoting movement in a clockwise direction, and at the same time the clamping piece is moved around protruding segment 17' of clip body 17.

Figure 8:
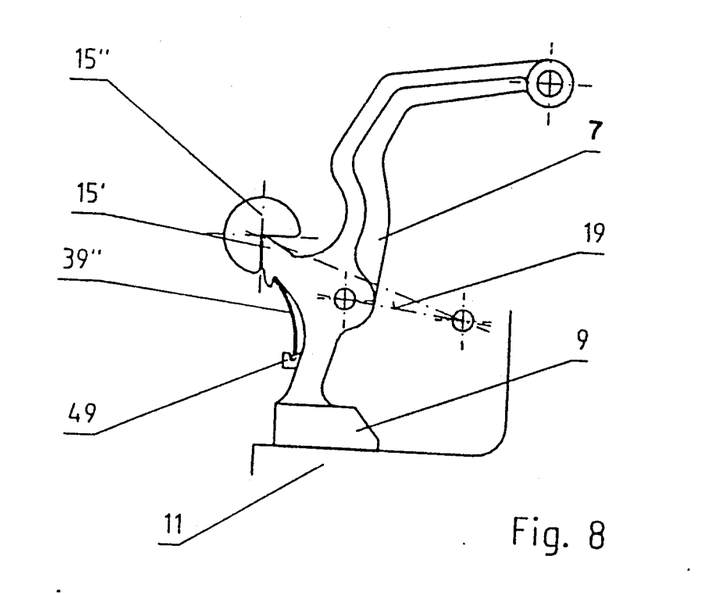
FIGS. 8 and 9 are cross-sectional views of a further embodiment of the present invention with a clip lever shown in both closed and open positions.
Figure 9:
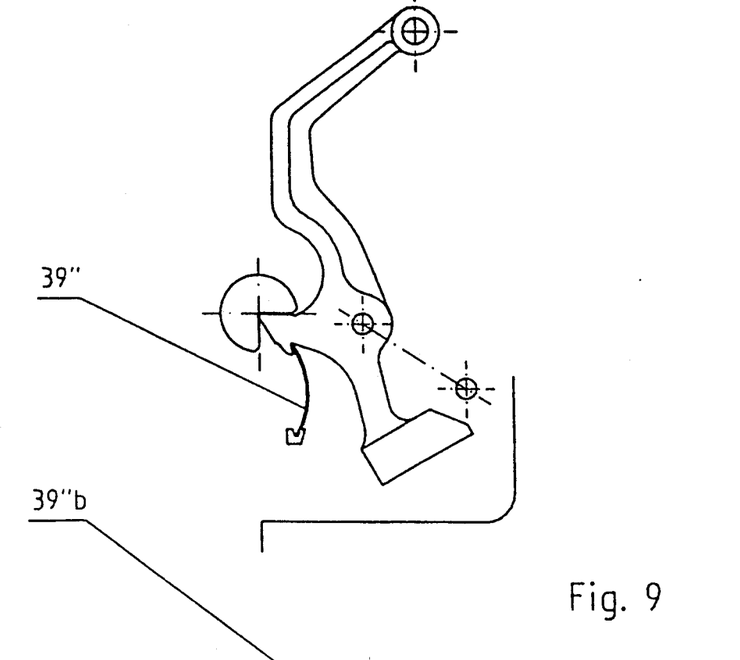

In the embodiment according to FIGS. 8 and 9, it is not a stationary stop that serves as adjustment limit 39, but rather stop spring 39", which preferably comprises a leaf spring. The leaf spring is supported on a projection of the clip lever that is located above the fabric (but also under knife-shaped bearing part 15') and on counter bearing 49 that is located lower, for example, running lengthwise in the direction of the clip carriage and held over it. If, when pivoting the clip lever into the locked position, the forces of stop spring 39" should not be enough to hold, the clip lever with its knife or its cutting edge 15' constantly in or on the bottom of the V-shaped bearing recess of second bearing part 15", then a return of the clip lever into its bearing position would take place by means of this stop spring 39", at least after a brief evading movement.

In FIGS. 8 and 9, the double-function spring 19 that has already been explained is also drawn in as a broken line. But this double-function spring 19 could also just as well be left out, since stop spring 39" in this case is also equipped with a dead center characteristic and also fulfills the purpose of double-function spring 19.

Figure 10:
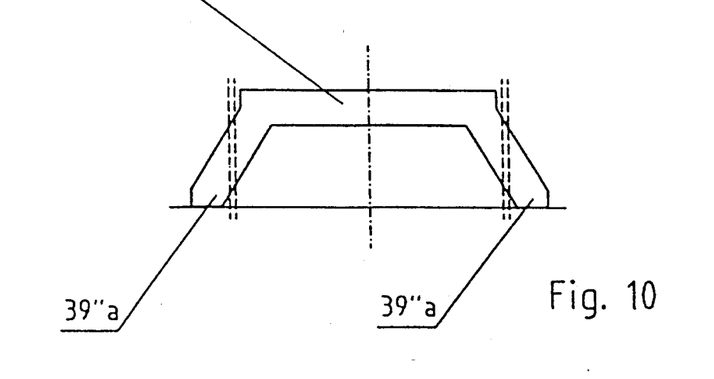
FIG. 10 is a diagrammatic longitudinal top view of a spring device shown in FIGS. 8 and 9.

Stop and/or double-function spring 39" in FIGS. 8 and 9 can be designed in the middle area or over the entire length of the clip lever running parallel to pivot axis and axis of tilt 29. It is also possible for a leaf spring to be placed and supported on each of the front ends of pivot axis and axis of tilt 29. In FIG. 10, it is explained only diagrammatically that, for example, stop spring 39" on both sides of the clip lever with its segments 39"a, for example, can be supported on two supports 49 designed on the front and back ends of the clip carriage and in the middle area between them on the clip lever with its offset segment 39"b.

Moreover the double-function spring—if it is provided—could also be designed as a leaf spring. Also, multiple leaf springs may be used with leaf spring segments bulging in opposite directions.

Figure 11:
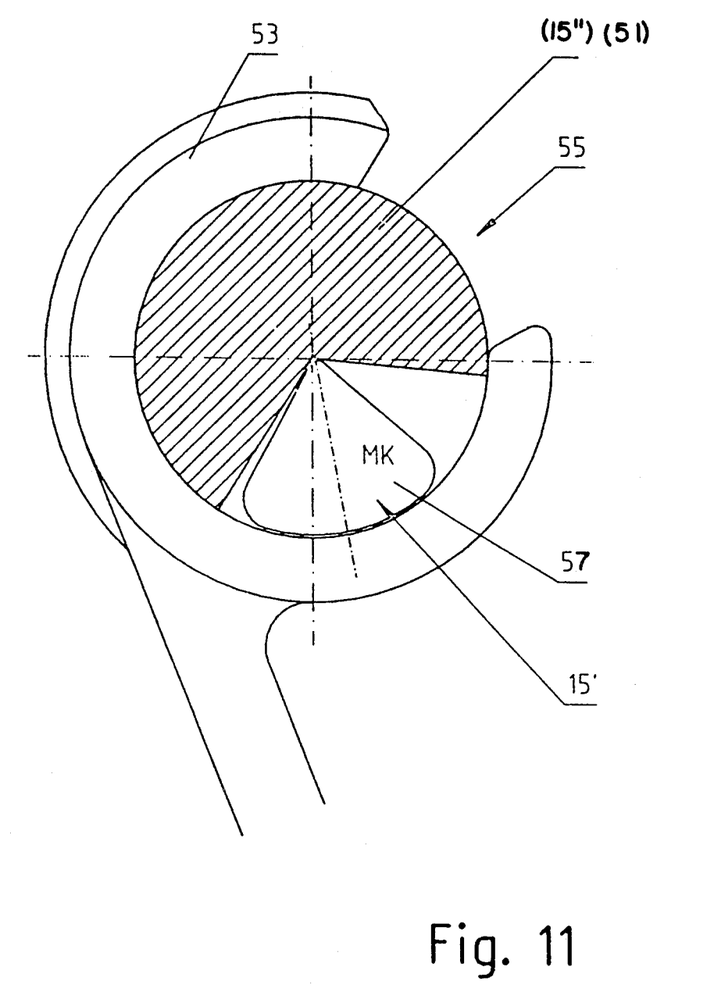
FIG. 11 is a diagrammatic front view of a further embodiment.
Figure 12:
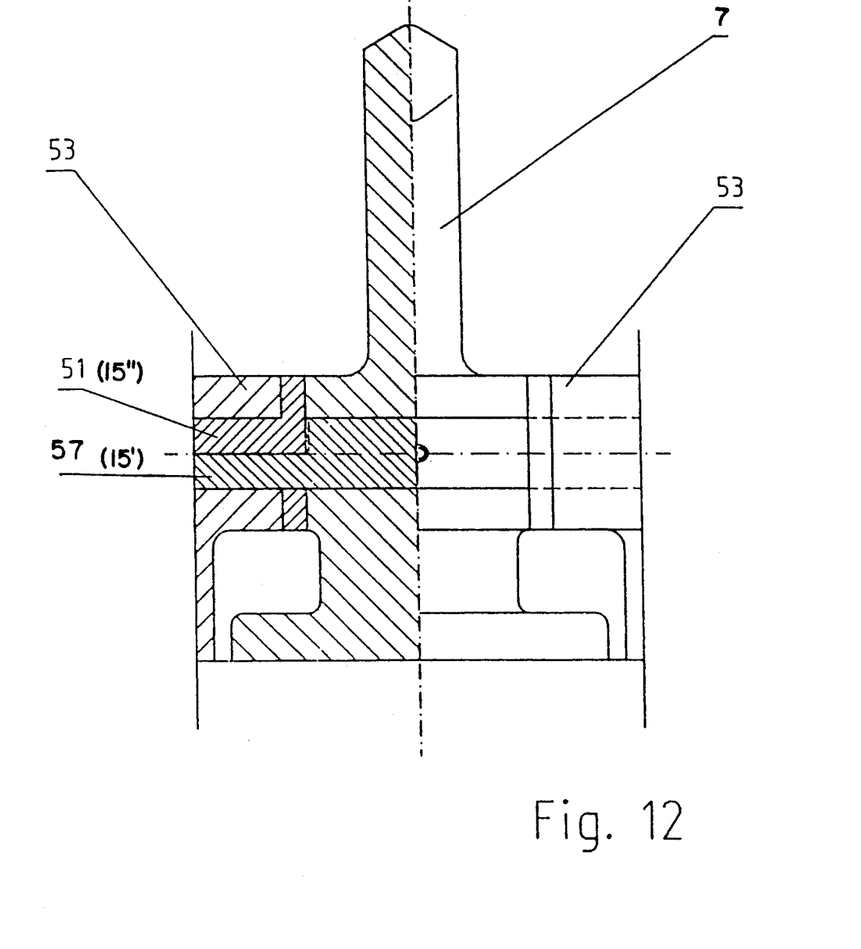
FIG. 12 is a diagrammatic longitudinal side view of the embodiment shown in FIG. 11.

In the embodiment according to FIGS. 11 and 12, another principle of solving the problem is implemented.

In the embodiment represented in FIGS. 11 and 12, bearing part 15" is equipped with an essentially V-shaped receiving indentation which runs parallel to the lengthwise direction of clip carriage 3. The mounting of clip lever 7 takes place only on a bearing part 15" which is in two parts or two sections and is provided on the forward and trailing end and which is designed in the manner of insert 51. This bearing part is mounted in receiving sleeve 53 with elongated slit 55, which is firmly anchored on the clip body. The width of opening of elongated slit 55 is dimensioned so that after appropriate turning of clip lever 7 with slaving of insert 51, both bearing projections 57, formed by bearing parts 15', can be taken out or inserted through elongated slit 55. In normal operation, inserts 51 that form counter-bearings 15" are normally braced or else projection 57 that is firmly connected (i.e., locked) with the knife flap forms the locking element, since the clip is in turn limited by the two positions of the double-function spring.

To remove the knife clip, it is only necessary to unhinge the double-function spring and to pivot the knife clip, until projection 57 covers opening 55. Then the knife clip can be taken out. For this purpose, also parts 51 can be dismantled by horizontal shifting.

Inserts 51 are slaved by bearing projection 57.

Figure 13:
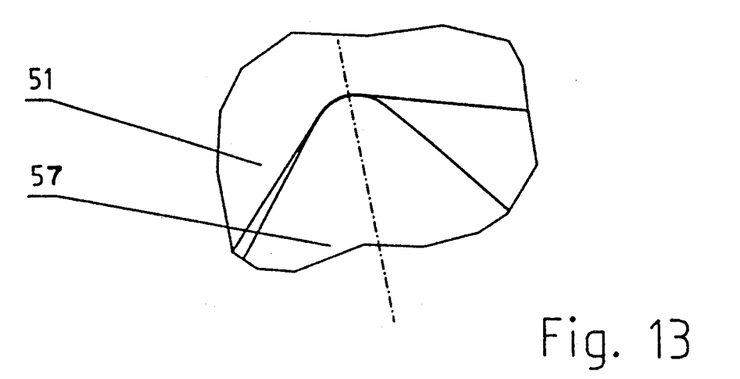
FIG. 13 is a diagrammatic front view of a modification of FIG. 11.

FIG. 13 shows only an enlarged detailed section, to represent that, in this embodiment, bearing part 15' is not sharp-edged. Counter-bearing part 15" is also not matched with part 15' at an acute angle, but rather in comparison is provided with a larger curved segment. Thus, an unrolling and rolling motion can be produced, to guarantee the cradle bearing.

Figure 14:
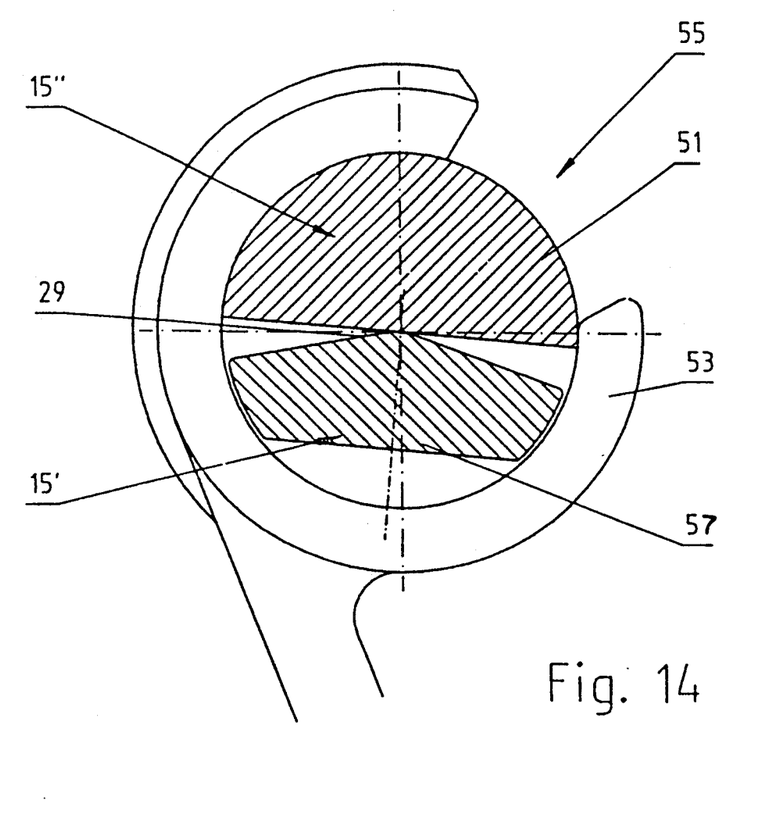
FIG. 14 is an enlarged detailed representation of a further embodiment.

By FIG. 14, a modification of FIGS. 11 and 12 is represented in that here insert 51 is equipped with a level counter-bearing surface that is aligned more or less parallel to the axial pivoting direction. Insert 51 forming bearing part 15', and designed with an appropriately provided radius of curvature, unwinds or unrolls on the counter-bearing surface during pivoting. By slotted receiving sleeve 53, swivable bearing projection 57 which is connected with clip lever 7, and which overlaps, is held in axial direction.

We claim:

1. A clip for detachably holding moving sheet webs against a surface, comprising:
   a clip lever having a first bearing part and a clamping piece spaced from said first bearing part;
   a clip body having a second bearing part, said first and second bearing parts forming a free cradle bearing;
   said clip lever being pivotal about said cradle bearing between closed and opened positions, said clip lever in said closed position locating said clamping piece in position to clamp the sheet webs between the clamping piece and the surface;
   means for biasing said clip lever into a stop limited end position;
   said first bearing part on said clip lever lying in engagement with said second bearing part, with one bearing part rotatable about an axis coincident with the bearing engagement of said first and second bearing parts.

2. A clip according to claim 1 including means for positively locking said first and second bearing parts for continuous bearing engagement with one another.

3. A clip according to claim 1 wherein said first bearing part is carried by said clip lever and comprises a knife-shaped bearing surface, said second bearing part carried by said clip body and having in cross-section a generally V-shaped bearing recess for receiving said knife-edge bearing surface.

4. A clip according to claim 1 wherein said first bearing part on said clip lever comprises in cross-section a generally V-shaped bearing recess and said second bearing part carried by said clip body comprises a knife-shaped bearing surface for reception in said V-shaped bearing recess.

5. A clip according to claim 3 wherein the bearing surfaces in engagement with one another are each provided with contact radii which are complementary to one another and which causes the surfaces to slide over one another.

6. A clip according to claim 1 wherein said first bearing part is provided with an engagement surface having a rolling radius that forms said axis and which surface rolls on said second bearing part when said first bearing part rotates about said axis.

7. A clip according to claim 1 wherein, in said end position of said clip lever relative to said clip body, said first and second bearing surfaces form an angle between surfaces thereof, enabling impurities to egress from said cradle bearing between the latter surfaces.

8. A clip according to claim 7 wherein said angle is at least 0.5°.

9. A clip according to claim 3 wherein the V-shaped bearing recess of said second bearing part is formed of a sector in a rod that is circular in cross-section and extends parallel to said axis.

10. A clip according to claim 1 including an adjustment limit cooperable between said clip lever and said clip body to preclude complete separation of said first and second bearing parts in response to locking forces acting on said clip lever in an open position thereof tending to separate said first and second bearing parts from one another.

11. A clip according to claim 10 including an adjustment limit surface carried by said clip body for engagement with a stop carried by said clip lever in response to separating movement of said first and second bearing parts relative to one another when locking forces act on said clip lever in an open position thereof.

12. A clip according to claim 10 wherein said adjustment limit comprises a stop carried by said clip body and a projection on said clip lever engageable by said stop when locking forces act on said clip lever in its open position.

13. A clip according to claim 10 wherein said adjustment limit comprises a spring supported on said clip lever and said clip body such that said spring counteracts locking forces acting on said clip lever tending to separate said first and second bearing parts.

14. A clip according to claim 13 wherein said spring holds said clip lever pre-stressed in a respective one of said end positions.

15. A clip according to claim 13 wherein said spring is formed of a multi-layer leaf spring.

16. A clip according to claim 1 wherein one of said first and second bearing parts has a crown enabling a shift in the pivoting action of said parts in a direction transverse to the lengthwise direction of said axis.

17. A clip according to claim 1 wherein said first and second bearing parts are disposed in a longitudinal sleeve.

18. A clip according to claim 1 wherein said biasing means includes a spring connected at opposite ends to a fixed support and said clip lever, respectively, said spring being connected to said lever at a location lying on opposite sides of a straight line between the fixed support and said axis when said clip lever lies in said open and closed positions, respectively.

* * * * *